UNITED STATES PATENT OFFICE.

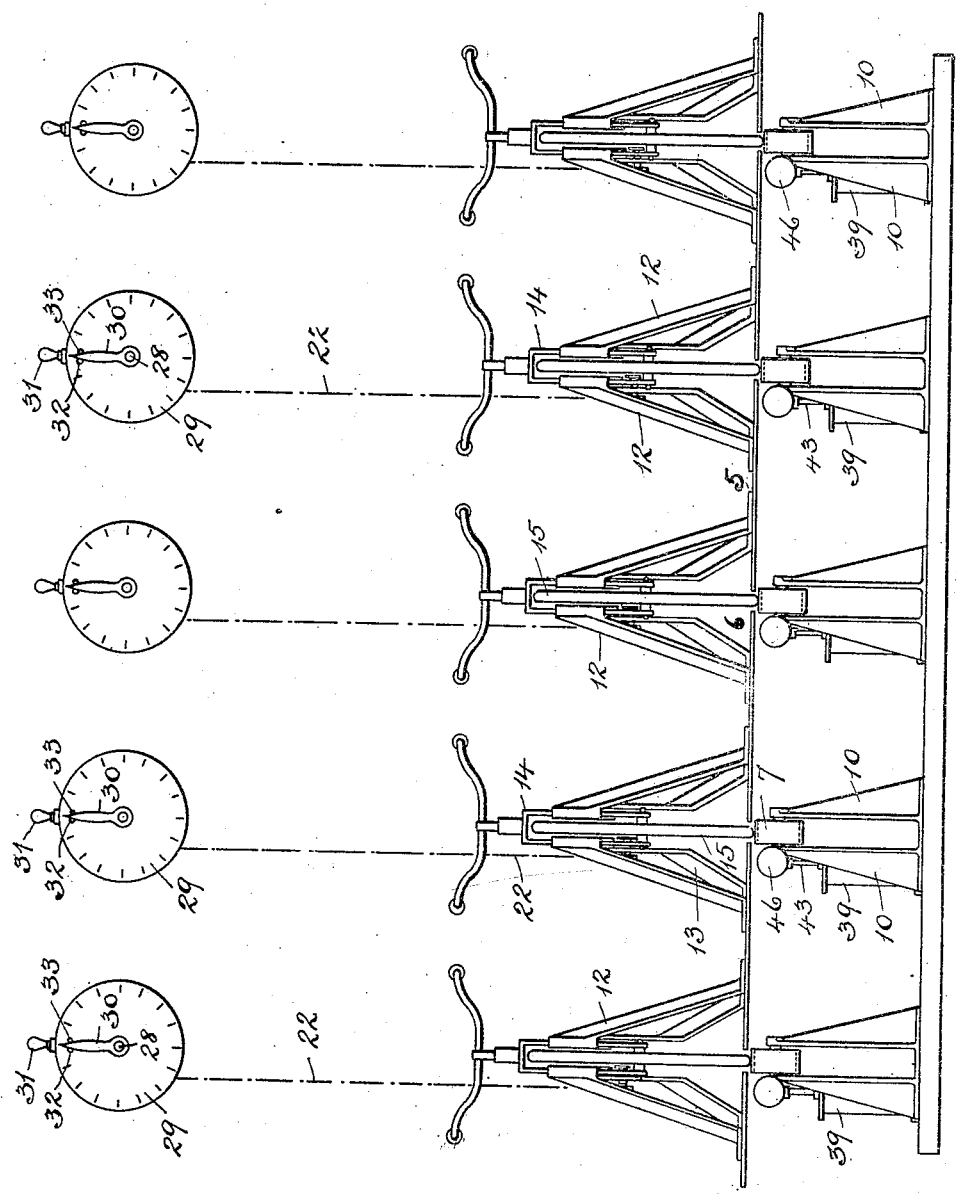

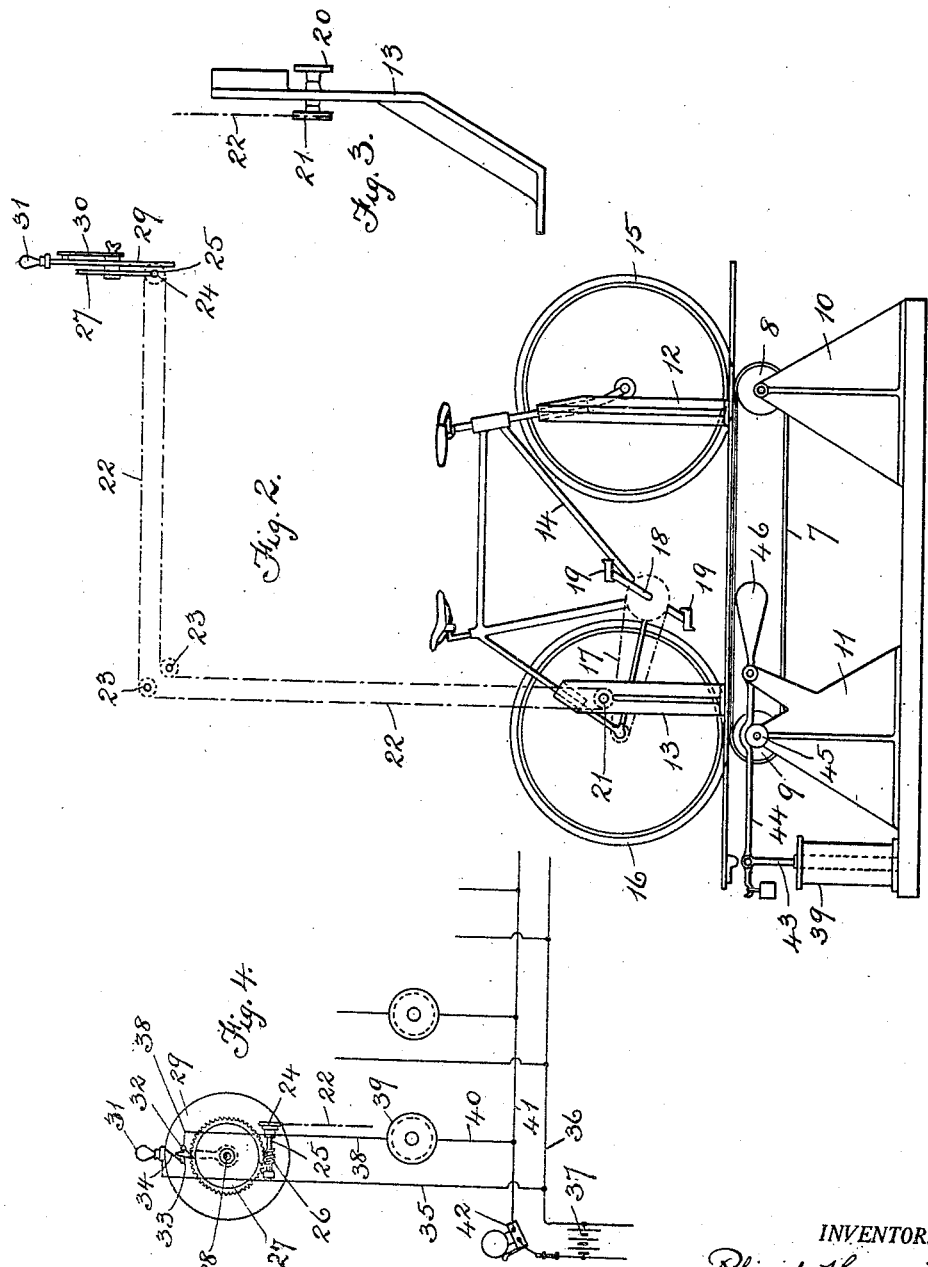

PHILIP HURWITZ, OF BALTIMORE, MARYLAND.

AMUSEMENT APPARATUS.

1,245,350.  Specification of Letters Patent.  Patented Nov. 6, 1917.

Application filed October 12, 1916. Serial No. 125,310.

*To all whom it may concern:*

Be it known that I, PHILIP HURWITZ, a citizen of the United States, residing at Baltimore city, in the State of Maryland, have invented certain new and useful Improvements in Amusement Apparatus, of which the following is a specification.

This invention relates to an improved amusement apparatus and has for its object to provide an apparatus of improved construction whereby a plural number of bicycles may be sustained in such manner as to prevent their advancement, but so that the driving wheel of each bicycle may be revolved by a rider independently of the other bicycles, and to connect the driving mechanism of each bicycle driving-wheel with one of the independent dial plate indicators by mechanical means, whereby the relative speed of operation of each rider of the whole number of riders competing, may be seen by persons who are in the audience, this being the effect that affords entertainment or amusement to the onlookers.

Another object is to combine with the above apparatus an improved means for giving a signal when a predetermined distance has been covered, and A further object is to provide improved means for checking the operation of the driving mechanism when the race or the predetermined distance has been covered.

The invention is illustrated in the accompanying drawings wherein,—

Figure 1, shows the apparatus in front elevation.

Fig. 2, illustrates the same in side view.

Fig. 3, shows one of the bicycle supports in front elevation and

Fig. 4, illustrates diagrammatically the wiring plan for electrically operating the signal and checking the driving mechanism.

In carrying out the invention I provide a platform 5, in which I form a plurality of slots 6, preferably parallel with each other, as shown in Fig. 1, of the drawing. Beneath the platform and in register with each slot I provide endless belts 7,—which latter travel over two spaced-apart rollers or pulleys 8 and 9. These pulleys are sustained by vertical bearing brackets 10 and 11, and each belt and its pulleys are separate and independent of the other belts and their pulleys.

At opposite sides of each slot 6, and on the upper side of the platform there are suitable bracket supports 12 and 13 respectively which engage the front and rear portions of a bicycle frame 14, and sustain the latter in a rigid upright position. Each bicycle is sustained over a slot 6, and the front wheel 15, rests upon the pulley or roller 8, which drives said front wheel freely; the rear or driving wheel 16, rests upon the pulley or roller 9, and is revolved by the foot-pedals in the usual manner through a chain 17, cranks 18, and pedals 19, and during its revolution it revolves pulley 9; drives belt 7, and thereby revolves pulley 8, so that the front wheel 15, of the bicycle is revolved as well as the rear wheel, but the bicycle does not advance because it is held therefrom by the brackets 12 and 13.

In carrying out my invention I propose to provide a register for each machine so that the speed of the latter or the distance that would be covered if the machine were allowed to advance may be recorded.

In the present instance five machines are illustrated, therefore there will be five registers, but the number may obviously be varied, and may be more or less than shown.

As all the registers and the driving mechanism are alike a description of one will be sufficient.

Each bracket 13, carries a short shaft on the inner end of which there is a sprocket wheel 20, to engage and be operated by the bicycle chain 17, and on the outer end, said short shaft carries another sprocket wheel 21.

A chain 22, passes around the sprocket wheel 21; then around suitable idlers 23, and finally passes around and drives a sprocket 24, on a short worm shaft 25, of a registering device, thereby driving said worm-shaft. The worm-shaft has a worm 26, that meshes with and drives a worm-wheel 27 at the rear of the registering device, and this worm wheel is carried on a shaft 28, which extends through to the front side of a dial face 29. A dial hand 30, is mounted on the end of the shaft 28, and turns with the latter in front of the dial.

It is believed to be clear that when the driving wheel is turned the chain 17, will operate the sprockets 20 and 21; drive the chain 22; sprocket 24, and worm shaft 25, and that the worm wheel 27, will revolve shaft 28, and turn the hand 30.

In order to clearly indicate which rider completes the race first I provide each register with an electric lamp 31, and when the hand of the dial makes a complete revolution it will close a circuit through the lamp and cause the latter to be illuminated. This feature of the invention is best shown in Fig. 4, of the drawing to which reference will now be made.

The dial plate 29, is provided with two electrically-insulated and spaced contact points 32, and 33, with which the hand 30, will contact when it has made a complete revolution. One of these points 33, is connected to the lamp 31, by a wire 34, while a wire 35, also leads from the lamp and connects with a current-supply line 36, that leads from a current supply or battery 37. A wire 38, connects the other contact point 32, with a solenoid or magnet 39, which latter has a function that will presently be described. Another wire 40, connects the solenoid or magnet with a return wire 41, to the current supply or battery.

From the above explanation it will be understood that when the dial hand 30, engages the two contact points, 32 and 33, it will act as a switch to close the circuit from the current supply or battery 37, through the lamp, but when said hand passes from one of said contact-points the circuit will be broken and the light will be extinguished.

In addition to the lamp I also desire to provide an audible signal in the form of a bell 42, which is simply placed in the line 41, and will be sounded when any one of the lamp circuits is closed.

When a race has been completed it is desirable to stop the rotation of the wheels 15 and 16, of the bicycle and bring the event to a close and to promptly do this I provide the solenoid or magnet 39, in each signal circuit which will become energized when the circuit is closed and will operate a rod 43, to draw a brake lever 44, against a brake pulley 45, on the shaft which carries pulley 9, thus applying friction to the pulley and retarding the pulley 9 and the driving wheel 16, of the bicycle.

A weight 46, is provided on the end of lever 44, to raise the latter when the solenoid or magnet is deënergized.

Having described my invention what I claim is,—

1. In an amusement apparatus the combination with a bicycle having a chain driving device, of means for sustaining the bicycle in an upright position; traveling means beneath the driving wheel of the bicycle; a registering device and an endless driving device between the chain drive of the bicycle and the registering device to operate the latter.

2. In an amusement apparatus the combination with a bicycle, of means for sustaining the bicycle to prevent its advancement; a registering mechanism; connections between the registering mechanism and a movable part of the sustained bicycle; a brake device and electrical means controlled by the registering mechanism for operating the brake device.

In testimony whereof I affix my signature in the presence of two witnesses.

PHILIP HURWITZ.

Witnesses:
CHARLES B. MANN, Jr.,
IZELLA E. BAGLEY.

Copies of this patent may be obtained for five cents each, by addressing the "Commissioner of Patents, Washington, D. C."